Aug. 26, 1969          P. PIGUET                3,463,453
                    HYDRAULIC MACHINE
Filed March 16, 1967                     2 Sheets-Sheet 1

INVENTOR

PIERRE PIGUET

BY  Emory L. Groff Jr.

ATTORNEY

Aug. 26, 1969  P. PIGUET  3,463,453
HYDRAULIC MACHINE
Filed March 16, 1967  2 Sheets-Sheet 2

INVENTOR
PIERRE PIGUET
BY Emory L. Groff Jr.
ATTORNEY

United States Patent Office 3,463,453
Patented Aug. 26, 1969

3,463,453
HYDRAULIC MACHINE
Pierre Piguet, Onex, Geneva, Switzerland, assignor to Ateliers des Charmilles S.A., Geneva, Switzerland, a corporation of Switzerland
Filed Mar. 16, 1967, Ser. No. 623,628
Claims priority, application Switzerland, Apr. 1, 1966, 4,849/66
Int. Cl. F01d 25/00; F03b 11/00
U.S. Cl. 253—26
9 Claims

ABSTRACT OF THE DISCLOSURE

A hydraulic machine comprises a turbine-wheel which can be driven empty in unimmersed state and has joints subject to circulation of spray-water or running water. The wheel and/or the housing is provided with one or more splash-rings with a lip arranged to expel centrifuged water through discharge channels. Lips carried by the housing may be of resilient material in sliding contact with the wheel.

---

The present invention relates to a hydraulic machine and particularly of the type comprising a working wheel such as a turbine wheel, a pump wheel or turbine-pump wheel respectively, capable of being driven empty in unimmersed state, this wheel being provided with joints subject to a circulation of spray or running water.

Hydraulic machines of this type are subject to loss of output through splashing of water between the principal faces of the wheel and adjoining surfaces.

It is an object of the present invention to provide an improved hydraulic machine which overcomes such loss of output.

Other objects and advantages will be apparent from the detailed description which follows.

According to the invention a hydraulic machine comprises a turbine wheel, a pump wheel or a turbine-pump wheel respectively, capable of being driven unloaded in unimmersed state, said wheel being furnished with joints subject to a circulation of spray water or of running water, wherein at least one lip is provided on which the spray water flows to the outlet of the joint, a water discharge channel being arranged close to said lip to collect water centrifuged by the wheel, so as to prevent it flowing against the principal faces of the wheel and reducing the output of the machine.

Figure 1:
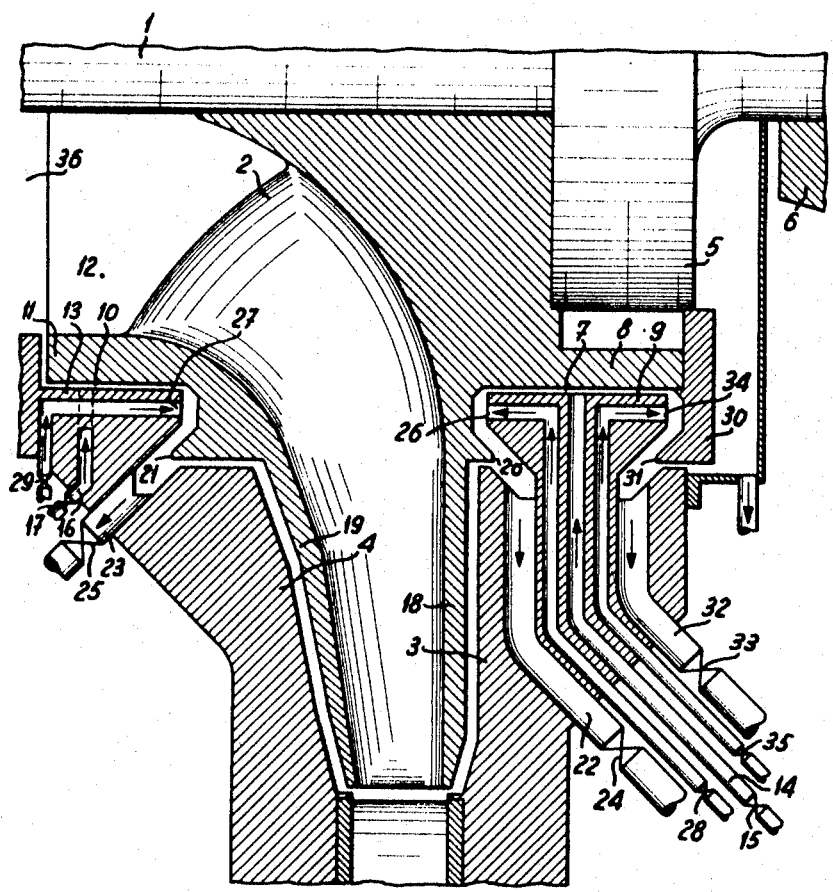
Figure 2:
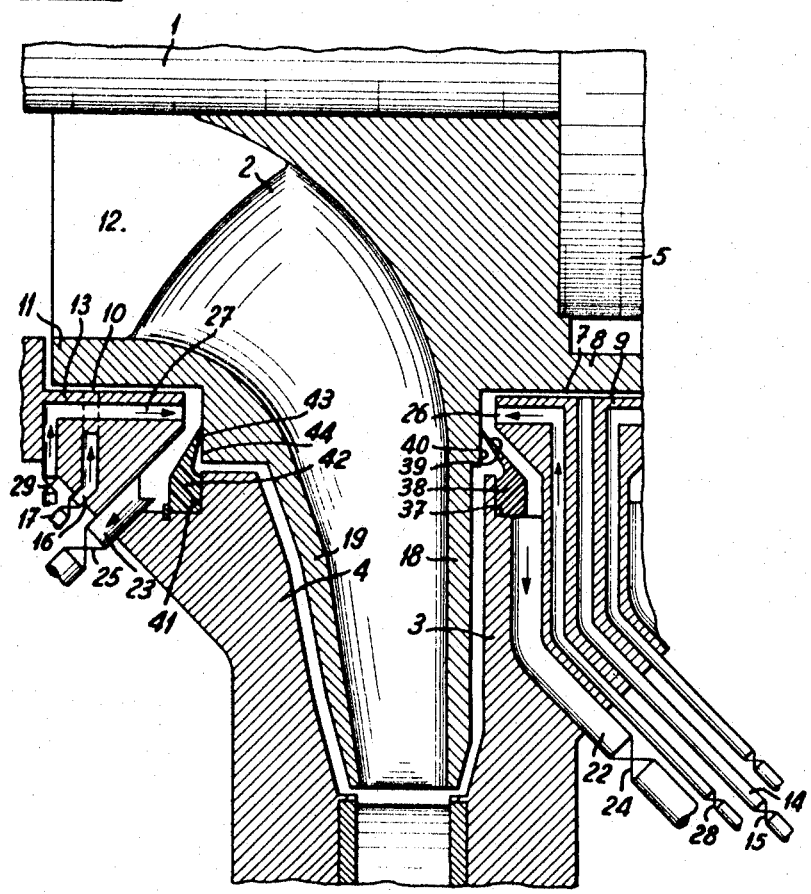

The invention will be more readily understood from the following description of two embodiments of a hydraulic machine according to the invention, described purely by way of non-limiting examples with reference to the accompanying drawings in which:

FIG. 1 shows schematically in axial section, a first said embodiment, being one form of a hydraulic pump wheel and its joints; and FIG. 2 shows in similar view, a second embodiment, being another form of such a pump wheel.

Referring first to FIG. 1, the hydraulic machine shown comprises a shaft 1 carrying a pump-wheel 2 turning between a bottom called "upper" 3 and a bottom called "lower" 4. This wheel is fixed to a flange 5 of the shaft 1 itself borne by a bearing 6. A first joint 7 is provided between the hub 8 of this wheel 2 and the neighbouring part 9 carried by the "upper" bottom 3. A second joint 10 is provided between the outer edge 11 of the inlet opening 12 in the pump-wheel 2 and the edge 13 of the corresponding opening arranged in the "lower" bottom 4. A conduit 14 controlled by a valve 15 enables the supply of spray water of the joint 7. A similar conduit 16, controlled by a valve 17, allows the feed of spray water of the joint 10.

During the operation of the pump unloaded in the unimmersed state, to prevent spray water flowing to the outlet of joint 7, 10 respectively, from wetting and causing a splashing between the principal faces 18, 19 respectively, of the wheel 2 and the walls facing bottoms 3 and 4, the wheel 2 has in proximity to the joint 7, 10 respectively, a splash-ring lip 20, 21 respectively. Furthermore, a water discharge channel 22, 23 respectively, is arranged in proximity to these lips 20 and 21 to collect the water centrifuged by the wheel 2. These discharge channels 22 and 23 are controlled by valves 24, 25 respectively.

In addition, to prevent the flow of spray water at its outlet of the joints 7 and 10 from creating a suction in this zone by evacuation of the air which is present there, an aeration conduit 26, 27 respectively, controlled by a valve 28, 29 respectively, is provided in each bottom 3, 4 respectively, and opens in proximity to each lip 20, 21 respectively, so as to replace the air progressively as it is entrained by the flow of water. The conduits 26 and 27 may possibly be connected on the space comprised between the parts 18 and 3, and 19 and 4 respectively.

The hydraulic machine shown by way of example is a pump of which the wheel is supposedly fixed on a shaft 1 which carries a turbine wheel and a rotor of an electric generator, not shown. It is therefore during the turbine operation of the hydraulic installation that the pump wheel 2 must be unimmersed and the feed of spray water of the joints 7 and 10 must be operative. The splash-ring will also be useful in the case of operation in a synchronous compensator of a reaction hydraulic machine.

This hydraulic machine comprises in addition a flange 30 shrunk on against the hub 8 of the wheel 2, this flange being terminated also by a peripheral splash-ring lip 31 cooperating with a discharge channel 32 controlled by a valve 33. An aeration conduit 34 controlled by a valve 35 allows also control of the pressure at the outlet of the joint not only in the direction of the pump wheel 2, but in the direction of the bearing 6, that is to say towards the outside of the machine.

The operation of the hydraulic machine described above is therefore as follows:

During the operation of the pump in unloaded condition, its wheel 2 must therefore be unimmersed by closing its inlet channel 36 by a valve, not shown, and possible inflow of air into the housing in which the wheel 2 turns. The valves 15 and 17 controlling the spraying of the joints 7 and 10 are opened, just as are the valves 24, 25 and 33 for controlling the discharge channels 22, 23 and 32. The control valves 28, 29 and 35 of the aeration conduits are also opened. In the course of the driving of the wheel 2 in rotation by the turbine borne on the same shaft 1, the spray water centrifuged by the wheel 2 and more particularly by the lips 20, 21 and 31 is therefore deflected towards the discharge channels 22, 23 and 32, which avoids all flow of water and splashing between the principal faces 18 and 19 of the wheel 2 and the corresponding bottoms 3 and 4 of the machine.

When the pump must operate effectively, the valves 15 and 17 for controlling the spray water are closed, as are the control valves 24 and 25 of the discharge channels 22 and 23. The control valves 28 and 29 of the aeration conduits 26 and 27 are also closed, so as to avoid all backflow of water through these conduits. On the other hand, the control valve 33 of the discharge channel 32 is opened, as is the control valve 35 of the aeration conduit 34.

The preceding description has been made with respect to a pump 2. However, it is clear that the same arrangement can be applied to a turbine or a hydraulic machine comprising two wheels, one a turbine and the other a pump, in juxtaposition. In the latter case, the flange 30 would hence be replaced by the turbine wheel which would be fixed on the face, on the right side with respect to the drawing, of the flange 5 of the shaft 1. In such a hydraulic machine of the turbine pump type, the joint 7 between the pump wheel and the turbine wheel then connects successively in one direction or in the other according as the machine functions as a turbine or a pump, the control valves of the different discharge channels for water and for aeration being manoeuvred accordingly. In such a machine, when the pump is in effective operation, the turbine wheel is therefore unimmersed and the joint 7 is then sprayed by water coming from the pump under pressure, water which is removed by the splash-ring lip arranged on the turbine wheel in front of the water outlet towards its discharge channel, the other joint of the wheel being, itself, sprayed as described above, so as to avoid all flow between the principal faces of the turbine wheel and the respective bottoms of the turbine.

Trials of a hydraulic machine of the type described above have shown that the arrangement represented enables a distinct gain in output for the operating assembly of the machine, due to the fact of the elimination of all loss of power by splashing during the discharge of spray water or across the joint 7.

In the preceding description, the hydraulic machine described is of the type with a horizontal shaft. However, it will be understood that the same arrangement of joints may be applied to a hydraulic machine with a vertical shaft.

A different arrangement from that shown of the discharge conduits would permit modification of the form of lips 20, 21 and 31 and reduce the form of the latter to the form of a simple shoulder or step.

The second embodiment shown in FIG. 2 has the same principal elements as the embodiment shown in FIG. 1. Identical reference numbers have been repeated on the two figures for parts having the same function.

However, in this second embodiment in place of a splash-ring lip being arranged on the wheel 2, as is the case in the first embodiment, this lip is borne, in this second embodiment, by a fixed part of the machine. In fact, in the second example shown, the "upper" bottom 3 has a groove 37 intended to receive a flexible fitting 38 of annular form having a lip 39 elastically supported against the facing part 40 of the wheel 2. The fitting 38 could be formed of plastics material, synthetic or natural rubber or even, possibly, a ductile metal such as brass, for example.

A similar construction to that described above, for the joint 7 may be applied to the joint 10. In this case, a groove 41 is arranged in the "lower" bottom 4 and a fitting 42 with a supple lip 43 is arranged in the groove 41 to be supported elastically against the facing surface 44 of the wheel 2.

The operation of the second embodiment is similar in all respects to that indicated for the first embodiment shown in FIG. 1.

Various changes and modifications may be made without departing from the essential concept of the invention as defined in scope by the appended claims.

I claim:

1. A hydraulic machine comprising a working wheel capable of being driven unloaded in unimmersed state, a shaft and a hub rotatable between a first joint at the downstream part of the hub and a second joint at the upstream part of the hub, said joints being subject to circulation of water from water feed conduits, at least one splash-ring arranged to deflect spray water centrifuged by the wheel and a water-discharge channel arranged close to said splash-ring to collect said centrifuged water, so as to prevent it from flowing against the principal faces of the wheel and reducing the output of the machine.

2. A hydraulic machine according to claim 1, wherein said splash-ring is a shoulder.

3. A hydraulic machine according to claim 1, wherein said splash-ring is a lip.

4. A hydraulic machine according to claim 1, including an aeration conduit opening close to said splash-ring to control the pressure of the joint.

5. A hydraulic machine according to claim 4, control valves being provided in each said water feed conduit, discharge channel and aeration conduit for closing said conduits and channel during the effective operation of the machine.

6. A hydraulic machine according to claim 1, wherein said splash-ring is arranged on the wheel.

7. A hydraulic machine according to claim 1, wherein said splash-ring is arranged on a stationary member of the machine.

8. A hydraulic machine according to claim 7, wherein said splash-ring is of flexible material and is supported slidingly against the facing part of the wheel.

9. A hydraulic machine according to claim 8, wherein said splash-ring is supported by a groove arranged on said stationary member.

References Cited

UNITED STATES PATENTS

| | | | |
|---|---|---|---|
| 2,926,887 | 3/1960 | Boyle | 253—26 X |
| 3,051,441 | 8/1962 | Sproule | 253—117 |
| 3,174,719 | 3/1965 | Sproule et al. | 253—26 |
| 3,239,193 | 3/1966 | Kerensky | 253—117 X |

EVERETTE A. POWELL, JR., Primary Examiner

U.S. Cl. X.R.

103—97